US012794234B2

(12) United States Patent
Arvanitis

(10) Patent No.: US 12,794,234 B2
(45) Date of Patent: Nov. 10, 2026

(54) SYSTEM AND METHOD FOR CONSERVING AUXILIARY ENERGY

(71) Applicant: Fluence Energy, LLC, Arlington, VA (US)

(72) Inventor: Ioannis Arvanitis, Berlin (DE)

(73) Assignee: FLUENCE ENERGY, LLC, Arlington, VA (US)

( * ) Notice: Subject to any disclaimer, the term of this patent is extended or adjusted under 35 U.S.C. 154(b) by 0 days.

(21) Appl. No.: 18/839,625

(22) PCT Filed: Jul. 24, 2024

(86) PCT No.: PCT/US2024/039327

§ 371 (c)(1),
(2) Date: Aug. 19, 2024

(87) PCT Pub. No.: WO2025/024544

PCT Pub. Date: Jan. 30, 2025

(65) Prior Publication Data

US 2026/0180328 A1 Jun. 25, 2026

Related U.S. Application Data

(60) Provisional application No. 63/528,797, filed on Jul. 25, 2023.

(51) Int. Cl.
*H02J 3/32* (2026.01)
*G05B 15/02* (2006.01)
(Continued)

(52) U.S. Cl.
CPC ................ *H02J 3/32* (2013.01); *G05B 15/02* (2013.01); *H01M 10/425* (2013.01);
(Continued)

(58) Field of Classification Search
CPC .. G05B 15/02; H01M 10/425; H01M 10/482; H01M 10/486; H01M 10/657;
(Continued)

(56) References Cited

U.S. PATENT DOCUMENTS

2005/0275372 A1* 12/2005 Crowell .................... H02J 7/56 320/112
2009/0144568 A1* 6/2009 Fung ....................... G06F 1/324 713/300

(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) issued Sep. 27, 2024, by the Commissioner for Patents in corresponding International Application No. PCT/US2024/039327. (9 pages).

*Primary Examiner* — Adnan Aziz
(74) *Attorney, Agent, or Firm* — Buchanan Ingersoll & Rooney PC

(57) ABSTRACT

An energy storage system includes an array controller configured to dispatch a required power flow across a first set of battery cores of a plurality of battery cores to operate the first set of battery cores in an online mode. The array controller is configured to instruct at least one power conversion system (PCS) of a second set of battery cores to operate in a standby mode to conserve auxiliary energy. The standby mode causes disabling of HVAC equipment of the at least one PCS of the second set of battery cores; and energizing and connecting an AC bus, a DC bus, or both but not running a power conversion unit of the second set of battery cores. The array controller is further configured to monitor environmental condition data of at least one PCS of the plurality of battery cores operating in the standby mode or the online mode.

20 Claims, 8 Drawing Sheets

(51) Int. Cl.
*H01M 10/42* (2006.01)
*H01M 10/48* (2006.01)
*H01M 10/60* (2014.01)

(52) U.S. Cl.
CPC ....... *H01M 10/482* (2013.01); *H01M 10/486* (2013.01); *H01M 2010/4271* (2013.01); *H01M 2220/10* (2013.01)

(58) Field of Classification Search
CPC ..... H01M 2010/4271; H01M 2220/10; H01M 6/50; H01M 6/5038; H01M 10/60; H01M 10/613; H02J 3/32; H02J 7/50; H02J 7/52; H02J 7/62; H02J 7/65; H02J 7/00; H02J 7/0013; H02J 9/00; Y02E 60/10
See application file for complete search history.

(56) References Cited

U.S. PATENT DOCUMENTS

| | | | | |
|---|---|---|---|---|
| 2016/0023571 | A1 | 1/2016 | Wu et al. | |
| 2017/0062885 | A1 | 3/2017 | Cutright et al. | |
| 2021/0143630 | A1 | 5/2021 | Du et al. | |
| 2022/0029429 | A1* | 1/2022 | Trippel | H02J 7/40 |
| 2023/0335995 | A1* | 10/2023 | Brooker | H02J 3/32 |
| 2023/0369864 | A1* | 11/2023 | Avery | H02J 13/10 |
| 2023/0396067 | A1* | 12/2023 | Manikfan | H02J 13/1331 |

* cited by examiner

SYSTEM AND METHOD FOR CONSERVING AUXILIARY ENERGY

CROSS-REFERENCE TO RELATED APPLICATIONS

This application is a U.S. National Phase Application of International Application No. PCT/US2024/039327, filed on Jul. 24, 2024, titled "SYSTEM AND METHOD FOR CONSERVING AUXILIARY ENERGY," the entirety of which is incorporated by reference herein. International Application No. PCT/US2024/039327 claims priority to U.S. Provisional Patent Application No. 63/528,797, filed on Jul. 25, 2023, titled "System and Method for Conserving Auxiliary Energy," the entire disclosure of which is incorporated by reference herein.

TECHNICAL FIELD

The present subject matter relates to an energy storage system that includes a plurality of battery cores. The present subject matter also encompasses controlling a first set of battery cores to operate in an online mode to dispatch a required power flow and a second set of battery cores to operate in a standby mode to conserve auxiliary energy.

BACKGROUND

An energy storage system, such as a battery energy storage system (BESS), can be set up in a distributed manner to satisfy safety and economical concerns. The energy storage system often includes associated components, such as many energy storage nodes that each include an enclosure that houses many batteries inside, and power conversion systems. Typically, the energy storage system includes a control system that monitors the energy storage nodes.

The battery energy storage system generally has two types of energy expenditures during which energy is discharged from the batteries of the energy storage nodes. The first type of energy discharged is primary energy to an electrical application that consumes energy from the energy storage system. The second type of energy discharged is auxiliary energy to maintain the energy storage system and the associated components within normal operating limits, such as for safety and reliability. The auxiliary energy can be consumed by the energy storage system, including heating, venting, and air conditioning (HVAC) equipment to maintain the batteries and power conversion systems at a suitable temperature; and keep the associated components energized and connected to a power bus.

Current state of the art control systems for battery energy storage systems do not attempt to conserve auxiliary energy to reduce the costs of the battery energy storage system. Consequently, existing energy storage systems can have higher operating costs. A control system is needed to conserve auxiliary energy while still enabling components of the energy storage system to operate safely and reliably, and last a long duration.

SUMMARY

In a first example, an energy storage system 101 comprises a battery array 150 including a plurality of battery cores 151A-N including a first set of battery cores 151A-C and a second set of battery cores 151D-F. Each of the battery cores 151A-N include at least one power conversion system (PCS) 104A-N. The at least one PCS 104A-N includes a power conversion unit 152, HVAC equipment 153, and at least one environmental sensor 164A-N to detect environmental condition data 165A-N. Each of the battery cores 151A-N further include at least one energy storage node 105A-N including a battery storage element 106A-N and a node controller 172A-N to receive battery data 111A-N from the battery storage element 106A-N and the environmental condition data 165A-N from the at least one PCS 104A-N. The energy storage system 101 further includes an array controller 170 to control the first set of battery cores 151A-C to operate in an online mode 166 to dispatch a required power flow 112 and a second set of battery cores 151D-F to operate in a standby mode 167 to conserve auxiliary energy. The array controller 170 is configured to receive or store the required power flow 112 for an electrical application 103 or a power capacity 113. The array controller 170 is configured to dispatch the required power flow 112 across the first set of battery cores 151A-C operating in the online mode 166. The array controller 170 is configured to instruct the at least one PCS 104D-F of the second set of battery cores 151D-F to operate in the standby mode 167 to cause: disabling of the HVAC equipment 153 of the at least one PCS 104D-F of the second set of battery cores 151D-F; and energizing and connecting an AC bus, a DC bus, or both 125 but not running the power conversion unit 152 of the second set of battery cores 151D-F. The array controller 170 is further configured to monitor the environmental condition data 165A-N of the at least one PCS 104A-N of each of the plurality of battery cores 151A-N operating in the online mode 166 or the standby mode 167.

In a second example, a non-transitory computer-readable medium 313, 353 includes auxiliary energy conservation programming 330A-B. Execution of the auxiliary energy conservation programming 330A-B by one or more processors 312, 352 configures one or more controllers 170-173 to receive or store a required power flow 112 for an electrical application 103 or a power capacity 113. Execution of the auxiliary energy conservation programming 330A-B by the one or more processors 312, 352 configures the one or more controllers 170-173 to dispatch the required power flow 112 across a first set of battery cores 151A-C of a plurality of battery cores 151A-N to operate the first set of battery cores 151A-C in the online mode 166. Each of the battery cores 151A-N include at least one power conversion system (PCS) 104A-N. The at least one PCS 104A-N includes a power conversion unit 152, HVAC equipment 153, and at least one environmental sensor 164A-N to detect environmental condition data 165A-N. Each of the battery cores 151A-N further include at least one energy storage node 105A-N including a battery storage element 106A-N and a node controller 172A-N to receive battery data 111A-N from the battery storage element 106A-N and the environmental condition data 165A-N from the at least one PCS 104A-N. Execution of the auxiliary energy conservation programming 330A-B by the one or more processors 312, 352 configures the one or more controllers 170-173 to instruct the at least one PCS 104A-N of the second set of battery cores 151D-F to operate in the standby mode 167 to conserve auxiliary energy to cause: disabling of the HVAC equipment 153 of the at least one PCS 104A-N of the second set of battery cores 151D-F; and energizing and connecting an AC bus, a DC bus, or both 125 but not running the power conversion unit 152 of the second set of battery cores 151D-F. Execution of the auxiliary energy conservation programming 330A-B by the one or more processors 312, 352 configures the one or more controllers 170-173 to monitor the environmental condition data 165A-N of the at least one PCS 104A-N of each of the plurality of battery cores 151A-N operating in the online mode 166 or the standby mode 167.

In a third example, a method 600 includes receiving or storing a required power flow 112 for an electrical application 103 or a power capacity 113. The method further includes dispatching the required power flow 112 across a first set of battery cores 151A-C operating in an online mode 166. Each of the battery cores 151A-N include at least one power conversion system (PCS) 104A-N. The at least one PCS 104A-N includes a power conversion unit 152, HVAC equipment 153, and at least one environmental sensor 164A-N to detect environmental condition data 165A-N. Each of the battery cores 151A-N further include at least one energy storage node 105A-N including a battery storage element 106A-N and a node controller 172A-N to receive battery data 111A-N from the battery storage element 106A-N and the environmental condition data 165A-N from the at least one PCS 104A-N. The method further includes 600 instructing the at least one PCS 104D-F of the second set of battery cores 151D-F to operate in the standby mode 167 to conserve auxiliary energy to cause: disabling of the HVAC equipment 153 of the at least one PCS 104D-F of the second set of battery cores 151D-F; and energizing and connecting an AC bus, a DC bus, or both 125 but not running the power conversion unit 152 of the second set of battery cores 151D-F. The method 600 further includes monitoring the environmental condition data 165A-N of the at least one PCS 104A-N of each of the plurality of battery cores 151A-N operating in the online mode 166 or the standby mode 167.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

PARTS LISTING

Figure 1A:
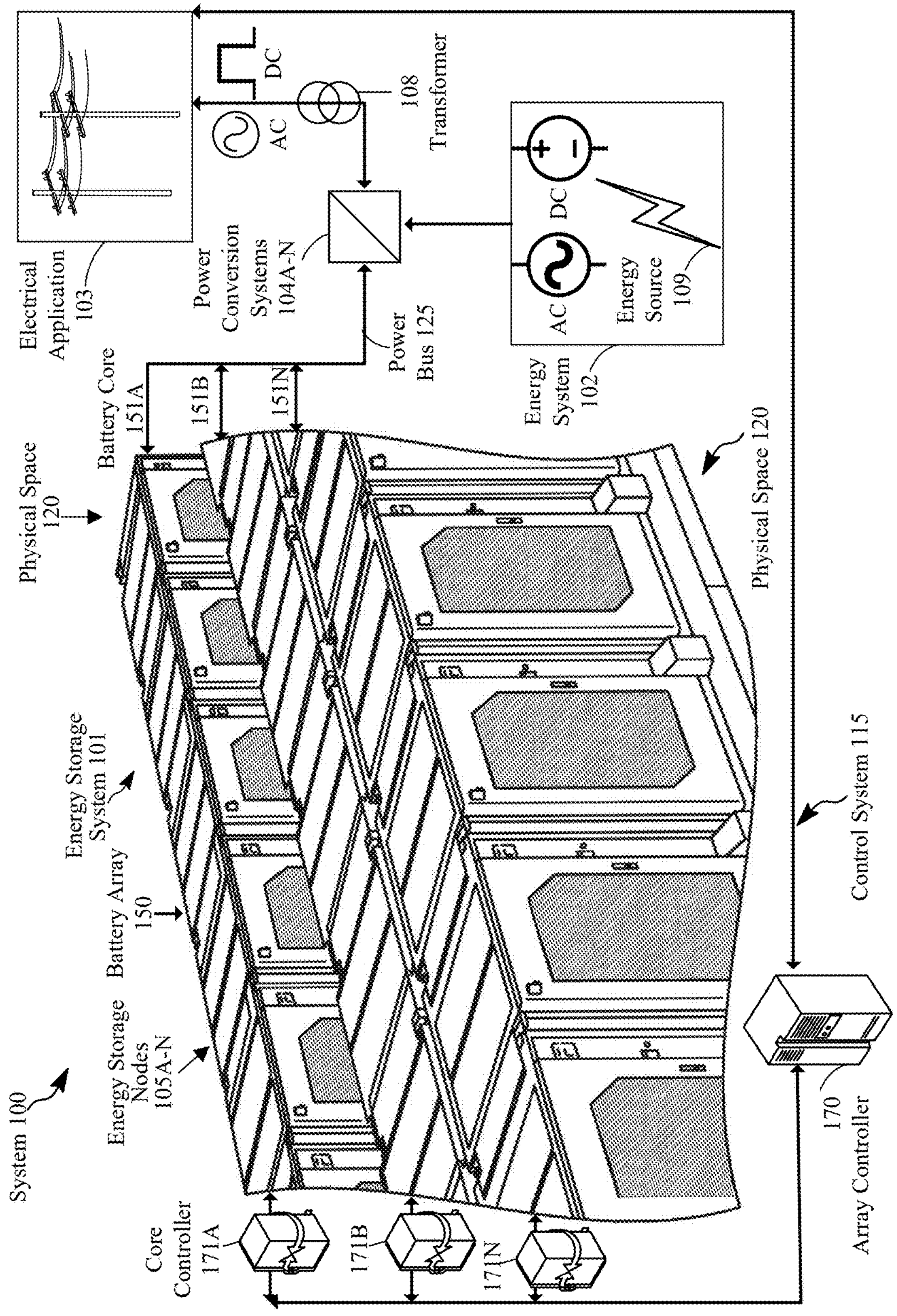
FIG. 1A depicts a system that includes an energy storage system, an energy system with a control system that includes various controllers, and an electrical application.

100 System
101 Energy Storage System
102 Energy System
103 Electrical Application
104, 104A-N Power Conversion Systems
105A-N Energy Storage Nodes
106, 106A-N Battery Storage Elements
107, 107A-N Power Conversion Subsystems
108 Transformer
109 Energy Source
111A-N Battery Data
112 Required Power Flow
113 Power Capacity
115 Control System
116A-N Battery States
117A-N Environmental Limits
118A-N Battery Thresholds
120 Physical Space
125 Power Bus
150 Battery Array
151A-N Battery Cores
152 Power Conversion Unit
153 HVAC Equipment
154 Fan
155 Condenser
156 Heater
160 PCS Controller
161 Network Communication Interface
162 Processor
163 Memory
164A-N Environmental Sensors
165A-N Environmental Condition Data
166 Online Mode
167 Standby Mode
168 HVAC Equipment
169 Schedule
170 Array Controller
171, 171A-N Node Controllers
172, 172A-N Core Controllers
173, 173A-N Enclosure Controllers
174 Market Dispatch Unit Controller
205 Power Inverter
210 Rectifier
215 DC-DC Converter
305, 305A-N Network
311, 351 Network Communication Interface
312, 352 Processor
313, 353 Memory
315A-N Sensors
330, 330A-B Auxiliary Energy Conservation Programming
365A-N Environmental Condition Data
370A-N Environmental Sensors
375A-N Battery Sensors
400 Auxiliary Energy Conservation Protocol

500 Enclosure
505 Battery Cube
600 Method

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Unless otherwise indicated, any embodiment can be combined with any other embodiment. In particular, 1A-6 and the associated text are all combinable with each other.

The term "coupled" as used herein refers to any logical, physical, electrical, or optical connection, link or the like by which electricity, power, signals, or light produced or supplied by one system element are imparted to another coupled element. Unless described otherwise, coupled elements or devices are not necessarily directly connected to one another and may be separated by intermediate components, elements, or communication media that may modify, manipulate or carry the electricity, power, signals, or light.

The orientations of the system 100, energy storage system 101, energy storage nodes 105A-N, associated components, and/or any complete devices, incorporating battery storage elements 106A-N, such as batteries, such as shown in any of the drawings, are given by way of example only, for illustration and discussion purposes. In operation for a particular energy storage application, an energy storage node 105A-N may be oriented in any other direction suitable to the particular application of the energy storage system 101, for example upright, sideways, or any other orientation. Also, to the extent used herein, any directional term, such as left, right, front, rear, back, end, up, down, upper, lower, top, bottom, and side, are used by way of example only, and are not limiting as to direction or orientation of any energy storage system 101 or energy storage nodes 105A-N; or component of an energy storage system 101 or energy storage nodes 105A-N constructed as otherwise described herein.

Unless otherwise indicated, any coupled electrical components can be linked in series or in parallel. In the case of energy storage nodes 105A-N or battery storage elements 106A-N, the components may be linked in series, in parallel, or a combination thereof depending upon a state of a switch or a submodule.

Reference now is made in detail to the examples illustrated in the accompanying drawings and discussed below.

FIG. 1A depicts a system 100 that includes an energy storage system 101, energy system 102 with a control system 115 that includes various controllers 170-174, and an electrical application 103. For example, the energy storage system 101 can be a battery energy storage system (BESS). The energy storage system 101 is coupled to the energy system 102 and the electrical application 103. Energy storage system 101 can include one or more power conversion systems (PCSs) 104A-N, a plurality of energy storage nodes 105A-N, an optional transformer 108, and a control system 115. Components of the energy storage system 101 can be located at a physical space 120 that is outdoors or indoors, for example, inside of a building, a container, or other structure.

Energy storage system 101 comprises a battery array 150 including a plurality of battery cores 151A-N including a first set of battery cores 151A-C and a second set of battery cores 151D-F. Each of the battery cores 151A-N include at least one power conversion system 104A-N. In an example, there can be one PCS 104 and one transformer 108 per battery core 151A-N (at the battery core level).

As described in further below, energy storage system 101 can include a control system 115 that includes one or more controllers 170-174, such as an array controller 170, core controllers 171A-N, node controllers 172A-N, enclosure controllers 173A-N, and a market dispatch unit controller 174. The control system 115 is configured to control a first set of battery cores 151A-C to operate in an online mode 166 to dispatch a required power flow 112 and a second set of battery cores 151D-F to operate in a standby mode 167, such as an idle state, to conserve auxiliary energy. The standby mode 167 is an energy savings mode that conserves auxiliary energy.

Power conversion systems 104A-N are coupled to the plurality of energy storage nodes 105A-N. The power conversion systems 104A-N are coupled to the energy system 102 and the electrical application 103 to provide a required power flow 112 to the electrical application 103 by discharging the plurality of energy storage nodes 105A-N or the required power flow 112 from the energy system 102 for charging the plurality of energy storage nodes 105A-N. The power conversion systems 104A-N can be coupled to an optional transformer 108. The optional transformer 108 can step up or step down the required power flow 112 to and from the electrical application 103, such as an AC voltage.

Energy system 102 can include any suitable system for producing electrical energy from an energy source 109. Energy system 102 can be a renewable energy system in which the energy source 109 can be replenished. Such a renewable energy source 109 can include solar power, wind power, geothermal power, biomass, and hydroelectric power. For example, the renewable energy system 102 can be implemented as an array of photovoltaic modules. The photovoltaic (PV) modules can include crystalline silicon, amorphous silicon, copper indium gallium selenide (CIGS) thin film, cadmium telluride (CdTe) thin film, and concentrating photovoltaic which uses lenses and curved mirrors to focus sunlight onto small, but highly efficient, multi-junction solar cells. In another example, the energy system 102 can include wind turbines or gas turbines. In some examples, the energy system 102 can be a non-renewable energy system in which the energy source 109 includes a non-renewable energy source, such as a fossil fuel.

Electrical application 103 can include an electrical grid, such as a power grid, or a smaller local load, such as a backup power system, for a facility such as a hospital, manufacturing site, residential home, or other suitable facility. The electrical application 103 may deliver AC or DC power for on-grid or off-grid applications, including commercial, industrial, or residential applications. The electrical application 103 may deliver power to buildings, electric vehicle charging stations, etc., including a variety of electrical loads that consume AC or DC electric power. The electrical application 103 can be a front-of-the-meter system that is owned or operated by a utility company or a behind-the-meter system that directly supplies buildings and homes with electricity.

Energy source 109 can be a renewable energy source, such as solar power and wind power, which can be intermittent and less reliable compared to fossil fuels. To improve resiliency, energy storage system 101 can store energy from the energy system 102 when the production from the energy source 109 is high. Later on, the energy storage system 101 can dispatch the energy to the electrical application 103 when demand is high or production from the energy source 109 is not keeping up with demand. Moreover, events may occur when a connected load or an operating demand load of the electrical application 103 is excessive or there is electrical grid instability, such as during extreme weather. By storing energy from the energy source 109 and then dispatching the energy during such events, the energy storage system 101 can continue to dispatch a required power flow 112 of the electrical application 103.

Energy storage nodes 105A-N include battery storage elements 106A-N. The battery storage elements 106A-N can be: (1) a single battery cell; (2) a cell grouping, including several battery cells in parallel configuration; (3) a battery submodule or module, including several battery cells in parallel and serial configuration; (4) a battery string, including several battery modules in series; (5) a battery bank, including several battery strings in parallel; (6) other known energy storage elements; and/or (7) a combination thereof. For example, the battery storage elements 106A-N can include a plurality of batteries of any existing or future reusable battery technology, including, but not limited to lithium ion, flow batteries, or mechanical storage, such as flywheel energy storage, compressed air energy storage, pumped-storage hydroelectricity, gravitational potential energy, or a hydraulic accumulator.

Control system 115 implements an auxiliary energy conservation protocol 400 (see FIG. 4), which addresses the increasing auxiliary energy costs of a BESS plant, especially when compared to the ancillary services it provides and the energy exchange in the electrical application 103, such as the electrical grid. The auxiliary energy conservation protocol 400 (see FIG. 4) reduces the use of integrated cooling and heating systems of the power components of the plant (power conversion systems 104A-N, battery management systems, etc.), which leads to the extended life of these components. The auxiliary energy conservation protocol 400 reduces auxiliary consumption of energy by a facility which, in turn, reduces the cost of the energy used by that facility. The energy savings mode feature of the auxiliary energy conservation protocol 400 enables the energy storage system 101 to automatically determine the number of PCSs 104A-N to be set into standby mode 167. When in the standby mode 167, a PCS 104 has both the AC and DC buses energized and connected but the power conversion unit 152 (e.g., IGBT module) is not running.

Figure 1B:
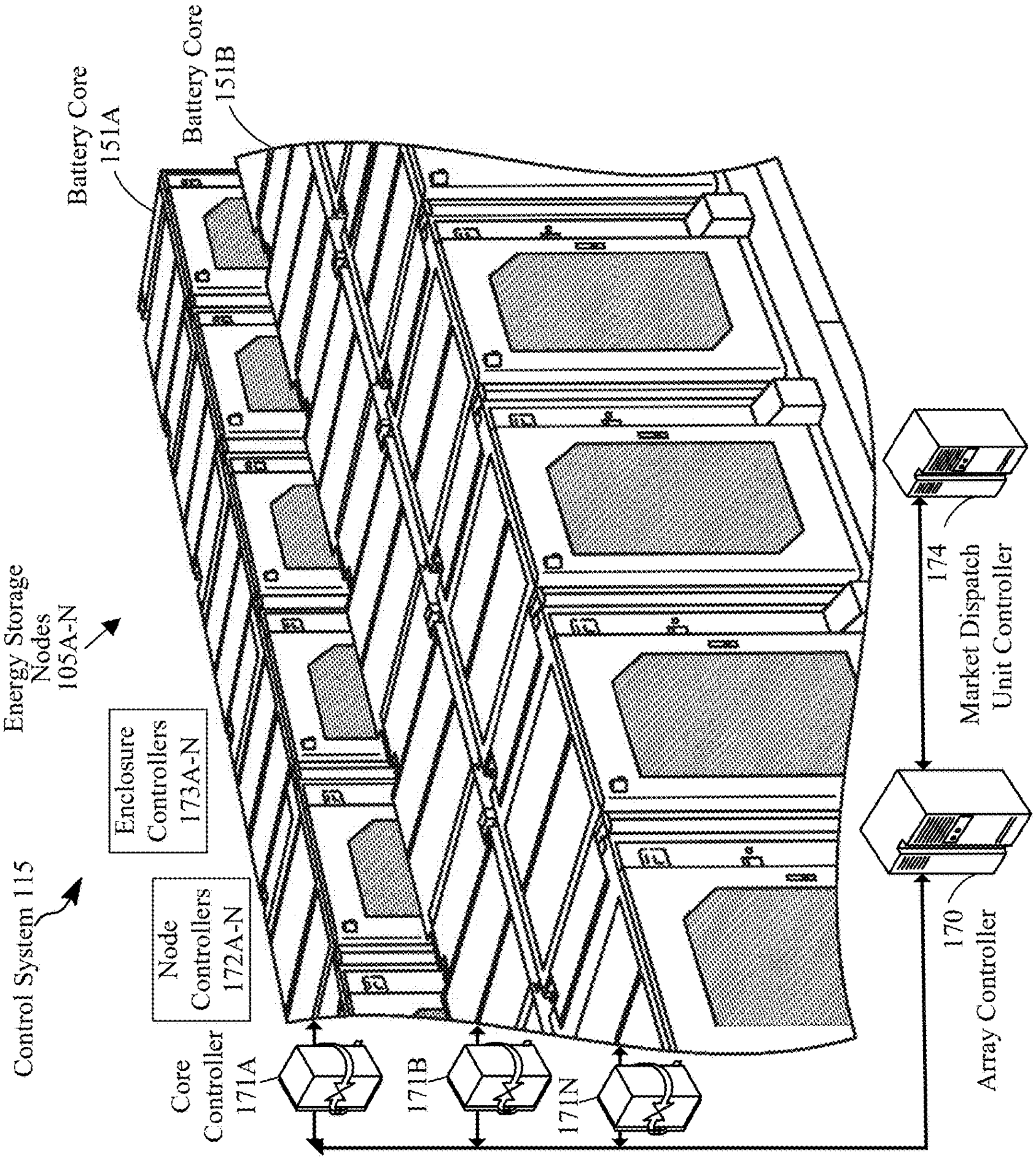
FIG. 1B depicts an array controller, core controllers, node controllers, and enclosure controllers of the control system of FIG. 1A.

FIG. 1B depicts an array controller 170, core controllers 171A-N, node controllers 172A-N, and enclosure controllers 173A-N of the control system 115 of FIG. 1A. In the example, each of the energy storage nodes 105A-N can be a collection of one or more battery cubes and every battery cube includes an enclosure controller 173. A node controller 172 is the lowest controllable element of a battery core 151 for an energy storage node 105A-N and controls an individual energy storage node 105. A core controller 171 is the next higher level, which controls a subset of the energy storage nodes 105A-N, where each core represents branches of components of the energy storage system 101. The core controller 171 is a logical controller and can represent a transformer 108 that stands between the PCS 104 and the rest of the plant. Core controller 171 is an aggregator of different node controllers 172A-N and propagates the commands from the array controller 170 to the node controllers 172A-N.

Array controller 170 is higher than the core controllers 171A-N and controls the overall energy storage system 101. The software for the array controller level can be installed at a customer site and can execute at the installation site. The array controller 170 can be a local decentralized service that runs onsite in real time.

The array controller 170 is configured to instruct the PCS 104 to enter an online state in the online mode 166 and thereby exit the offline state of the standby mode 167. The array controller 170 can instruct the PCS 104 to come online and the PCS 104 takes care of the rest by running the power conversion unit 152 and enabling the HVAC equipment 153. Similarly, in the standby mode 166, the array controller 170 instructs the PCS 104 to go offline by turning off the power conversion unit 152 and disabling the HVAC equipment 153. Generally, it is up to the PCS 104 to decide what to do, but the array controller 170 instructs the PCS 104 to go online in the online mode 166 or offline in the standby mode 167.

A market dispatch unit controller 174 is a network wide controller and sits on top of the array controller 170 and looks at specific market requirements. The market dispatch unit controller 174 sets dispatch setpoints in terms of active and reactive power to the array controller 170 which deals with the energy storage system 101.

In an example auxiliary energy conservation protocol 400 (see FIG. 4), decisions are driven at the top by the array controller 170. Core controllers 171A-C have battery cores 151A-C that are in the online mode 166 to inject or consume power and the rest of the battery cores 151D-N may be in the standby mode 167 as instructed by the array controller 170. The node controllers 172A-N are the closest controller to the PCSs 104A-N. The standby mode 167 can be implemented on a specific energy storage node 105A-N by the respective node controller 172A-N.

The array controller 170 is the plant controller and implements most of the algorithm of the auxiliary energy conservation protocol 400 for auxiliary energy savings. The node controller 172A is the gateway to the PCS 104A and controls the PCS 104A to change between online mode 166 or standby mode 167. The node controller 172A is the first to realize if the PCS 104A is in standby mode 167 and the gateway to instruct the PCS 104A to enter the online mode 166 or standby mode 167. The node controller 172A protects the PCS 104 and sets the humidity and temperature levels of the PCS 104A via the HVAC equipment 153 based on the operating limits of the PCS 104A. Alternatively or additionally, if the node controller 172A determines that a battery state 116A-C (e.g., temperature) of a battery storage element 106A is too far below a battery threshold 118A-C, the node controller 172A can request the array controller 170 to consider entering the PCS 104A into the online mode 166 from the standby mode 167 to keep the battery storage element 106A within operating limits.

A battery core 151 can have multiple node controllers 172A-N depending on the number of energy storage nodes 105A-N and bus architecture of the battery core 151. In an example, if the PCS 104 is used as a single bus element, then there may be only one node controller 172 behind a core controller 171 for a single energy storage node 105A and only one PCS 104 per energy storage node 105A. But if the PCS 104 is used with multiple DC connections in a split bus architecture where a plurality of energy storage nodes 105A-D (e.g., four) are connected to the bus, there can be a plurality of energy storage nodes 105A-D on the bus and only one PCS 104 for all of the plurality of energy storage nodes 105A-D.

Figure 1C:
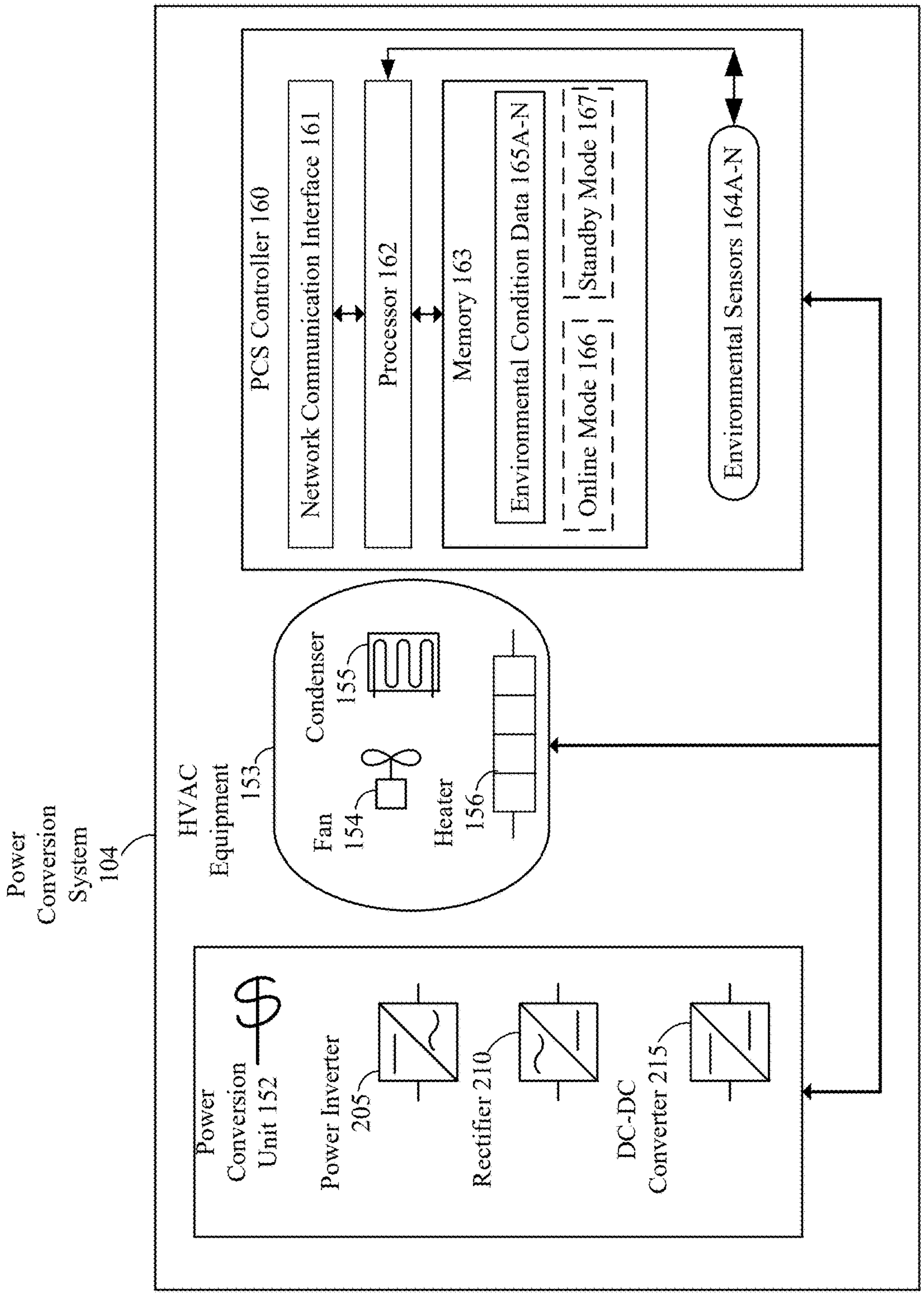
FIG. 1C depicts a power conversion system of a battery core of FIG. 1A.

FIG. 1C depicts a power conversion system 104 of a battery core 151 of FIG. 1A. As shown, the power conversion system 104 can include a power conversion unit 152, which can include a power inverter 205, rectifier 210, DC-DC converter 215, etc., or a combination thereof. The power conversion unit 152 can be an insulated-gate bipolar transistor (IGBT) module that is part of the PCS 104. The IGBT module can include an array of transistors, capacitors, and any other power electronic devices to convert power. On one side of the power conversion unit 152 can be AC current and the other side DC current. The IGBT module is standard, but a variety of architectures can be used.

Power conversion system 104 further includes HVAC equipment 153 to maintain the temperature of equipment of the PCS 104, such as the power conversion unit 152, within operating limits. The HVAC equipment 153 can include an air conditioner, such as a fan 154 and a condenser 155 to cool down the power conversion unit 152 (e.g., IGBT module). The HVAC equipment 153 can further include a heater 156. During online mode 166, the HVAC equipment 153 of the PCS 104 can cool down the power conversion unit 152. During standby mode 167, when the power conversion unit 152 of the PCS is not running, there is no need to run the HVAC equipment 152 to cool the power conversion unit 152.

The power conversion system 104 further includes a PCS controller 160 and environmental sensors 164A-N to protect the equipment of the PCS 104. As shown, the PCS controller 160 includes a network communication interface 161, a processor 162, and a memory 163. The environmental sensors 164A-N are coupled to the processor 163 and can collect environmental condition data 165A-N, for example, by measuring temperature 165A and humidity 165B inside of an enclosure of the PCS 104. The memory 163 can store the environmental condition data 165A-N collected by the environmental sensors 164A-N and the mode of the PCS 104, such as online mode 166 or standby mode 167. The environmental condition data 165A-N is monitored during the auxiliary energy conservation protocol 400 (see FIG. 4) and acted upon to make decisions when to run the HVAC equipment 153 of the PCS 104.

While in the standby mode 167, which is an energy savings mode that conserves auxiliary energy, the PCS 104 can disable the HVAC equipment 153 which decreases the auxiliary energy needs of the PCS 104. Additionally, the array controller 170 can monitor a temperature 165A and a humidity 165B of the PCS 104 to avoid any violation of the predefined idle/operation environmental limits 117A-N while in the standby mode 167. A level of the state of charge 116A of the connected battery storage elements 106A-N is also monitored to avoid further discharge below a predefined battery threshold 118A for the state of charge 116A.

Figure 2:
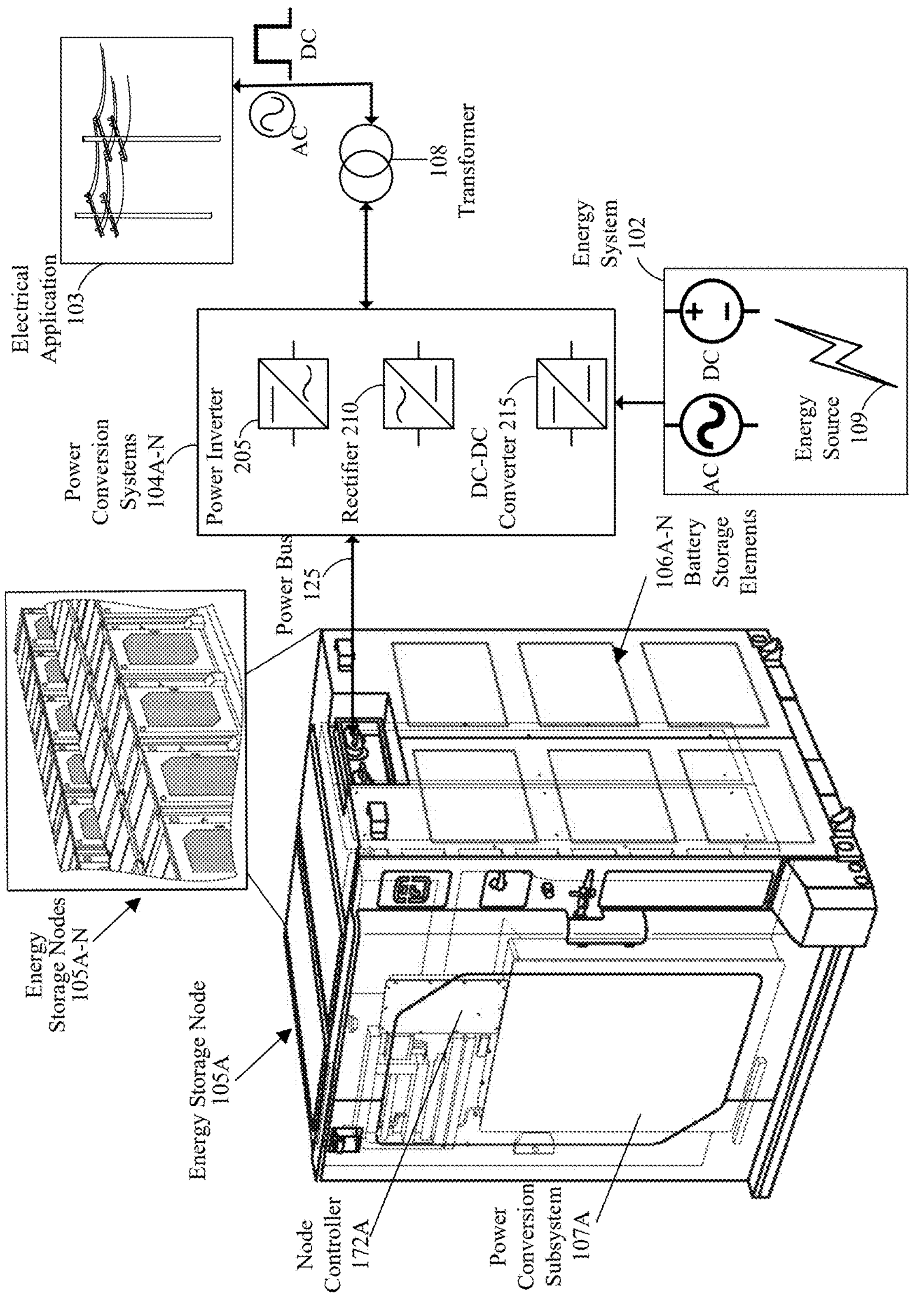
FIG. 2 illustrates a first energy storage node of a plurality of energy storage nodes of the energy storage system of FIG. 1A coupled to the electrical application.

FIG. 2 illustrates a first energy storage node 105A of the plurality of energy storage nodes 105A-N of FIG. 1A coupled to the electrical application 103. Energy storage nodes 105A-N can include a battery storage element 106, a power conversion subsystem 107, and a node controller 172 to receive battery data 111A-N from the battery storage element 106, the power conversion subsystem 107, or a combination thereof. Energy storage system 101 can be controlled such that the electrical application 103 is fulfilled while dispatching the required power flow 112 across the first set of battery cores 151A-C operating in the online mode 166 and instruct the at least one PCS 104A-N of the second set of battery cores 151D-F to operate in the standby mode 167 to conserve auxiliary energy.

Power conversion system 104 can include a power inverter 205, a rectifier 210, a DC-DC converter 215, other power conversion elements, or a combination thereof. Power inverter 205 can be configured to convert a DC source, such as from the battery storage elements 106A-N, into an AC waveform. Rectifier 210 can be configured to convert an AC source, such as from the energy system 102 or electrical application 103, into DC for the battery storage elements 106A-N. DC-DC converter 215 can be configured to convert a DC source, such as from the battery storage elements 106A-N, into a different DC source characteristic.

If the energy source 109 is wind power, then the power conversion system 104 can convert the AC electricity produced into DC power for storage in the plurality of energy storage nodes 105A-N via the rectifier 210. If the energy source 109 is solar power, then the power conversion system 104 can convert the DC electricity into a different voltage level via the DC-DC converter 215. The power inverter 205 can convert the required power flow 112 from the energy storage system 101 from DC power into AC power during dispatch to the electrical application 103. For example, the power inverter 205 can be configured to convert power on a power bus 125 (e.g., AC bus, DC bus, or both) for use by the electrical application 103. For example, the power inverter 205 converts DC power stored in the energy storage nodes 105A-N into AC power for consumption by electrical loads of the electrical application 103.

Power conversion subsystem 107 includes similar hardware and software as the more centralized power conversion system 104. Power conversion subsystem 107 is distributed more locally to each of energy storage nodes 105A-N. The node controller 172 can be configured for local computation, processing, and control of the battery storage elements 106A-N and the power conversion subsystem 107. The control system 115 can be configured for more centralized computation, processing, and controls of the overall energy storage system 101, energy system 102, electrical application 103, and power conversion system 104. The various controllers 170-172 of the control system 115, including the array controller 170, core controller 171A-N, node controllers 172A-N, and enclosure controllers 173A-N can include a single board computer, an application-specific integrated circuit (ASIC), microcontroller, digital signal processor (DSP), field-programmable gate array (FPGA), or a combination thereof.

Figure 3:
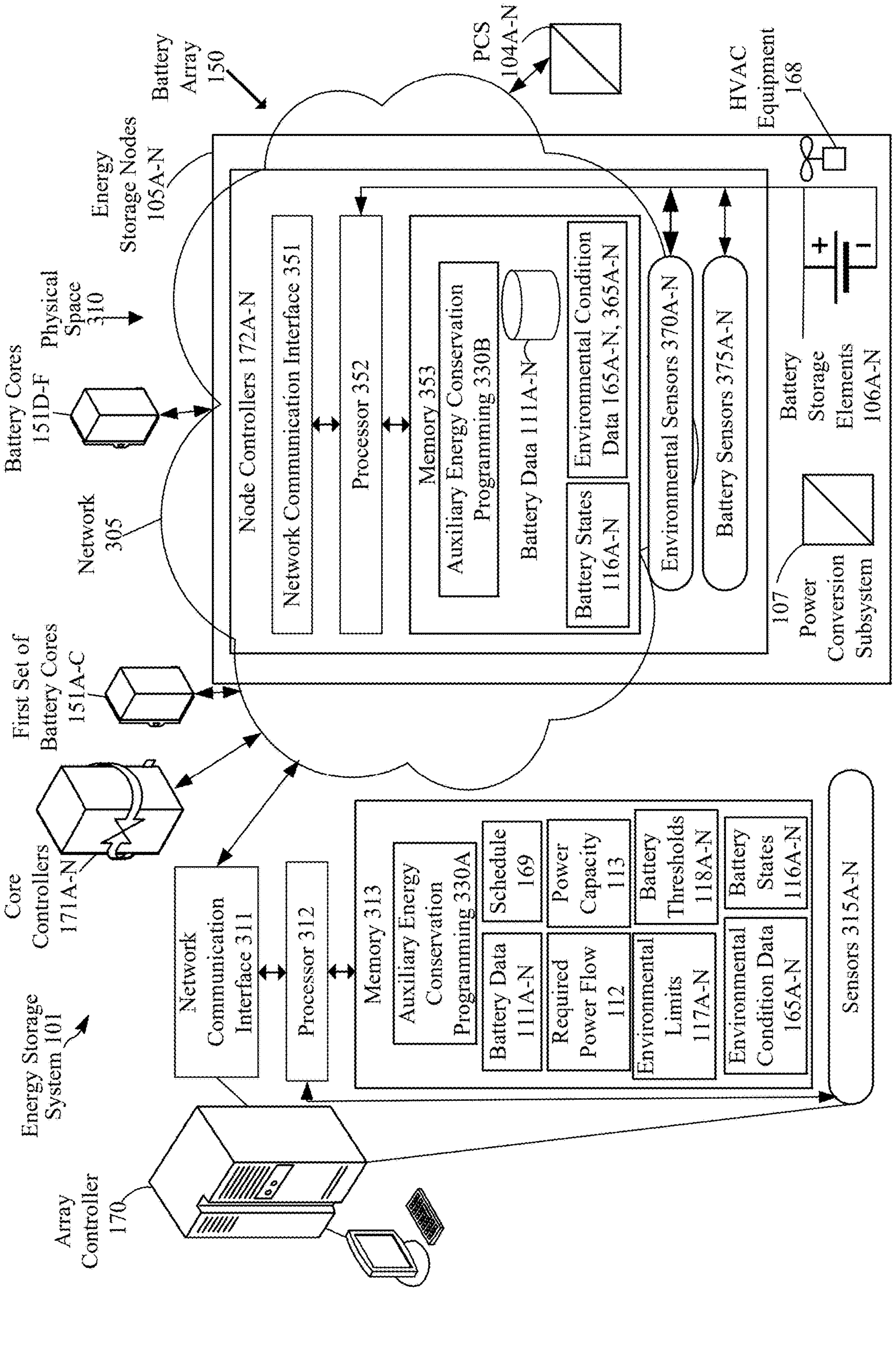
FIG. 3 is a high-level functional block diagram of the energy storage system of FIG. 1A that depicts components of the control system with various controllers and the energy storage nodes to conserve auxiliary energy.

FIG. 3 is a high-level functional block diagram of the energy storage system 101 of FIG. 1A that depicts components of the control system 115 with various controllers 170-172 and the energy storage nodes 105A-N to conserve auxiliary energy. As shown, the plurality of energy storage nodes 105A-N include a battery storage element 106A-N, a power conversion subsystem 107, and a node controller 172 to receive battery data 111A-N from the battery storage element 106A-N, the power conversion subsystem 107, or a combination thereof.

The control system 115, including the array controller 170, core controllers 171A-N, node controllers 172A-N, and enclosure controllers 173A-N; energy storage nodes 105A-N; electrical application 103; and other components of the system 100 can be in communication over a network 305 or one or more networks 305A-N. The networks 305A-N can be a local area network 305A, wide area network 305B, or a combination thereof. For example, the control system 115 can be coupled via a local area network 305A to the energy storage nodes 105A-N and the electrical application 103. Alternative or additionally, the control system 115 can be coupled via a wide area network 305B to the energy storage nodes 105A-N and electrical application 103. Or the control system 115 can be coupled via a combination of networks 305A-N, such as via a local area network 305A to components of the energy storage system 101, including the energy storage nodes 105A-N, and coupled via a wide area network 305B to the electrical application 103.

Array controller 170 includes a network communication interface 311 configured for wired or wireless communication over the network 305. The array controller 170 further includes a memory 313, and a processor 312 coupled to the network communication interface 311 and the memory 313. As shown, the memory 313 of the array controller 170 is configured to store auxiliary energy conservation programming 330A, battery data 111A-N, a schedule 169, required power flow 112, power capacity 113, environmental limits 117A-N, battery thresholds 118A-N, environmental condition data 165A-N, and battery states 116A-N. The array controller 170 can also include sensors 315A-N coupled to the processor 312 to detect or monitor various system parameters, such as power, temperature, voltage, current, resistance, and/or impedance. For example, the sensors 315A-N can be coupled to the power bus 125.

Control system 115 is configured to receive or store a required power flow 112 for an electrical application 103 or a power capacity 113. The required power flow 112 can include an active power (e.g., measured in kW or mW), a reactive power (e.g., measured in kVARs), or a total system power discharge or charge requirement. The power capacity 113 can be apparent power (e.g., kVA or MVA), such as name plate capacity measured in volt-amperes that can be used for power electronics or electronic equipment to define capabilities in terms of overall power. Both active power and reactive power come together to form apparent power and manufacturers define the capability of the power capacity 113 of power electronics equipment based on the apparent power.

There can be minimum buffers for active power and reactive power of the required power flow 112 coming from a request for a configuration to always have a minimum buffer of power capacity 113 to be online in the energy storage system 101. For example, assume the customer instructs the array controller 170 to conserve auxiliary energy, but always keep a minimum buffer of 2 MWA of power capacity 113 online at all times. The array controller 170 converts and translates this minimum buffer of power capacity 113 into how many PCSs 104A-N exist, the reported power capacity (name plate capacity) of the PCSs 104A-N, and then selects a subset of PCSs 104A-N to have online to satisfy the power capacity 113 based on the customer's instruction and regardless of the required power flow 112.

The required power flow 112 can be a power command for the electrical application 103 based on a customer or independent system operator request received over the network 305 from the electrical application 103, in which case the power command is externally determined. The power command for the electrical application 103 can be based on parameters in a customer or independent system operator request received over the network 305 from the electrical application 103. For example, the parameters can be to provide frequency regulation with a deadband and a slope of the response. The control system 115 can take the parameters and attempt to determine the power command, for example, based on satisfying the customer or independent system operator request for the electrical application 103.

Control system 115 can take the required power flow 112 needed for the electrical application 103, for example, as requested by a customer or software application and determine the optimal way to distribute the required power flow 112 across all of the energy storage nodes 105A-N. This optimization may be conducted in several manners, for example using traditional operational optimization techniques or machine-learning based techniques. The control system 115 can include one or more processors or computing devices that can be configured to perform closed loop management of real and reactive power supplied to the electrical application 103.

Energy storage nodes 105A-N include a node controller 172, battery storage elements 106A-N, a power conversion subsystem 107, and HVAC equipment 168 which can reside on each individual energy storage node 105A-N. The HVAC equipment 168 residing on each energy storage node 105A-N is separate from the HVAC equipment 153 of the PCS 104, but can similarly include a fan 154, a condenser 155, and a heater 156. During the standby mode 167, the HVAC equipment 153 of the PCS 104 can be turned off to conserve auxiliary energy. Alternatively or additionally, the separate HVAC equipment 168 residing on the energy storages nodes 105A-N may be turned off to conserve auxiliary energy during the standby mode 167.

Node controller 172 of the energy storage nodes 105A-N includes a network communication interface 351 configured for wired or wireless communication over the network 305. The node controller 172 further includes a memory 353, and a processor 352 coupled to the network communication interface 351 and the memory 353. As shown, the memory 353 of the node controller 172 is configured to store auxiliary energy conservation programming 330B, battery data 111A-N, battery states 116A-N, and environmental condition data 165A-N, 365A-N.

The node controller 172 further includes environmental sensors 370A-N and battery sensors 375A-N coupled to the processor 352. Environmental sensors 370A-N can collect environmental condition data 365A-N, for example, by measuring humidity and temperature inside of an enclosure 500 of the energy storage nodes 105A-N. Battery sensors 375A-N can include a voltage sensor 375A, a current sensor 375B, and a temperature sensor 375C to measure readings of battery data 111A-N, such as a voltage 111A, a current 111B, a temperature 111C, or other physical phenomena occurring within the battery storage elements 106A-N. The memory 353 can store the environmental condition data 165A-N, 365A-N collected by the environmental sensors 164A-N, 370A-N and the battery data 111A-N measured by the battery sensors 375A-N.

The control system 115 is configured to determine at least one battery state 116A-N about one or more of the energy storage nodes 105A-N from the battery data 111A-N. The battery states 116A-N can be algorithmically determined estimates from battery data 111A-N, readings from the sensors 315A-N that monitor various system parameters on the power bus 125, or a combination thereof, for example. State estimating algorithms can take the measured readings of battery data 111A-N, including the voltage 111A, the current 111B, the temperature 111C, or a combination thereof as input parameters and estimate the battery states 116A-N based on the battery data 111A-N.

For example, a state of charge 116A is a state estimate derived from the voltage 111A and the current 111B readings. The state of charge 116A can be derived from the control system 115. Alternatively or additionally, a battery management system or the node controller 172 can derive the state of charge 116A.

The array controller 170 can manage power commands to the node controller 172 to charge or discharge the plurality of energy storage nodes 105A-N based on the required power flow 112. For example, the array controller 170 can send the power commands based on the total required power flow 112 to the plurality of energy storage nodes 105A-N. Alternatively or additionally, the node controller 172 can issue the power commands directly at the plurality of energy storage nodes 105A-N based on the required power flow 112.

In FIG. 3, the energy storage system 101 comprises a battery array 150 including a plurality of battery cores 151A-N including a first set of battery cores 151A-C and a second set of battery cores 151D-F. Each of the battery cores 151A-N include at least one power conversion system (PCS) 104A-N. The at least one PCS 104A-N includes a power conversion unit 152, HVAC equipment 153, and at least one environmental sensor 164A-N to detect environmental condition data 165A-N. The node controllers 172A-N can receive the environmental condition data 165A-N from the PCS 104 for processing and propagate the environmental condition data 165A-N to the core controllers 171A-N and the array controller 170. The node controllers 172A-N can have an interface to the PCS 104 via the bus.

Each of the battery cores 151A-N further include at least one energy storage node 105A-N including a battery storage element 106A-N and a node controller 172A-N to receive battery data 111A-N from the battery storage element 106A-N and the environmental condition data 165A-N from the at least one PCS 104A-N. The energy storage system 101 further includes an array controller 170 to control the first set of battery cores 151A-C to operate in an online mode 166 to dispatch a required power flow 112 and a second set of battery cores 151D-F to operate in a standby mode 167 to conserve auxiliary energy.

Array controller 170 is configured to receive or store the required power flow 112 for an electrical application 103 or a power capacity 113. The array controller 170 is further configured to dispatch the required power flow 112 across the first set of battery cores 151A-C operating in the online mode 166. Typically, the power capacity 113 is not needed at this stage because the power capacity 133 is how many PCSs 104A-N have to be connected, not the required power flow 112. The array controller 170 is configured to instruct the at least one PCS 104D-F of the second set of battery cores 151D-F to operate in the standby mode 167 to cause: disabling of the HVAC equipment 153 of the at least one PCS 104D-F of the second set of battery cores 151D-F; and energizing and connecting an AC bus, a DC bus, or both 125 but not running the power conversion unit 152 of the second set of battery cores 151D-F. The power conversion systems 104D-F can be instructed to enter the standby mode 167 and based on that instruction the PCSs 104D-F behave accordingly. The PCSs 104D-F know the requirements of the standby mode 167 and implement the standby mode 167 based on the requirements.

During the energizing and connecting of a battery core 151, the PCS 104 is responsible for connecting to the AC side of the power bus 125 because it is expected to always have voltage and frequency levels on the AC side. On the DC side, the node controller 172 is responsible for connecting the battery storage elements 106A-N first and then instructing the PCS 104 that the battery storage elements 106A-N are online and to energize the DC counterpart and connect the internal DC conductors. The array controller 170 orchestrates connecting between components of the energy storage nodes 105A-N, the battery energy storage elements 106A-N, and the PCSs 104A-N, which typically only occurs on the DC side. On the AC side, the components should be ready, that is, the transformer 108 should be energized, a substation controller controlling the breakers, etc. Because the DC side is energized and connected, the state of charge 116A of the battery storage elements 106A-N can be depleted. The battery storage elements 106A-N are energizing the DC bus and there is small resistance there so if the battery storage elements 106A-N are left connected for days or even hours, the state of charge 116A will deplete and have significant drop. Thus, the array controller 170 can monitor battery states 116A-N, including the state of charge 116A.

The array controller 170 is further configured to monitor the environmental condition data 165A-N of the at least one PCS 104A-N of each of the plurality of battery cores 151A-N operating in the online mode 166 or the standby mode 167. The monitoring can occur in all of the battery cores 151A-N and repeatedly over time regardless of whether the battery cores 151A-N are in a state of online mode 166 or standby mode 167. The environmental condition data 165A-N can include temperature 165A, humidity 165B, or a combination thereof 165A-B.

If a subset or all of the first set of battery cores 151A-C is overheating, then a subset or all of the second set of battery cores 151D-F from the second set of battery cores 151D-F can be swapped to relieve the first set of battery cores 151A-C. The array controller 170 can be configured to instruct the at least one PCS 104D-F of the second set of battery cores 151D-F to come online and operate in the online mode 166 or go idle in the standby mode 167 based on the environmental condition data 165A-N of the first set of battery cores 151A-C not satisfying an environmental limit 117A-N. In an example of swapping the battery cores 151A-F, the array controller 170 flags a first set of battery cores 151A-C that are in the online mode 166 and overheating for replacement based on the monitoring. Consequently, the array controller 170 can bring online the second set of battery cores 151D-F that are in the standby mode 167 by switching the second set of battery cores 151D-F to the online mode 166.

Another reason for swapping is the required power flow 112 which is another major factor that drives bringing more of the second set of battery cores 151D-F online to provide more power. The array controller 170 can be further configured to instruct the at least one PCS 104A-C of the first set of battery cores 151A-C to operate in the standby mode 167 in response to the power capacity 113 being satisfied by the second set of battery cores 151D-F. The array controller 170 may turn off and remove a subset or all of the first set of battery cores 151A-C only if the power capacity 113 is satisfied by the second set of battery cores 151-D-F. For example, if the provided power capacity 113 is sufficient to satisfy the required power flow 112. The sequence is to first bring the second set of battery cores 151D-F online to make sure there is enough power capacity 113 and then take the overheating first set of battery cores 151A-C offline in the standby mode 167 by instructing the PCSs 104A-C.

The array controller 170 can be configured to run the power conversion unit 152 of the at least one PCS 104A-N of the second set of battery cores 151D-F to enter the online mode 166 in response to a battery state 116 derived from the battery data 111A-N of the first set of battery cores 151A-C not satisfying a battery threshold 118A-N. For example, the battery state 116A-N can include state of charge 116A, voltage 116B, temperature 116C, or a combination thereof. The battery thresholds 118A-N can be operating limits or ranges for a state of charge limit 118A (state of charge threshold), a voltage limit 118B (voltage threshold), a temperature limit 118C (temperature threshold), etc. In one example, the battery state 116A-N includes the state of charge 116A and the battery threshold 118A-N includes a state of charge limit 118A.

In a first example of battery states 116A-N, the first set of battery cores 151A-C that are in online mode 166 can have a state of charge 116A that is rapidly decreasing, which converts into little power capability or is too low and does not satisfy the state of charge limit 118A. In this example, the array controller 170 can select a subset or all of the second set of battery cores 151D-F with a higher state of charge to come online (online mode 166) to bring up the state of charge 116A to have more power.

In a second example of battery states 116A-N, if the second set of battery cores 151D-F are left in the standby mode 167 for a long time because the DC bus is connected to the battery storage elements 106A-N, there is a small amount of minor continuous discharge from the battery storage elements 106A-N. To avoid a depleted state of charge 116A of the battery storage elements 106A-N, the array controller 170 monitors battery states 116A-N of the battery storage elements 106A-N in the second set of battery cores 151D-F. If the state of charge 151A of the second set of battery cores 151D-F is very low, then the second set of battery cores 151D-F are brought online (online mode 166). Array controller 170 then brings offline (standby mode 167) the energy storage nodes 105A-N with the lowest state of charge 116A in first set of battery cores 151A-C based upon bringing the second set of battery cores 151D-F online.

In a third example, if the first set of battery cores 151A-C are being discharged, then the array controller 170 can select the battery cores 151A-B with the lowest state of charge 116A to switch to the standby mode 117. The battery cores 151A-C selected in the first set of battery cores 151A-C to bring down can optionally enter the standby mode 167 although it is not required. For example, if at the same moment the energy storage system 101 needs more power flow from the plant, then the battery cores 151A-B in the first set of battery cores 151A-C may not be brought down by the array controller 170. As another example, if the first set of battery cores 151A-C are being charged by the energy system 102, then the array controller 170 can select the battery cores 151A-B with the highest state of charge 116A to switch to the standby mode 167.

Control system 115 can also implement time-based parameters 170. For example, the node controller 172A-N can be configured to swap the first set of battery cores 151A-C and the second set of battery cores 151D-F based on a schedule 169 that includes at least one time-based parameter. For example, the schedule 169 can select a particular node controller 172A and PCS 104A to be in the online mode 166 for a first selected amount of time, such as twelve hours, and then be in the standby mode 167 for a second selected amount, such as twelve hours. The schedule 169 can enable the first set of battery cores 151A-C and the second set of battery cores 151D-F to be swapped in and out of being online (online mode 166) and offline (standby mode 167) in time intervals. For example, if the energy storage system 101 includes ten PCSs 104A-J in the plant, and the array controller 170 desires to always keep two PCSs 104A-B at a time online, the schedule 169 can rotate to give all ten PCS 104A-J a chance to run the HVAC equipment 153. So implicitly, there may not be issues involving environmental conditions at the PCS 104. The array controller 170 can use time-based parameters, environmental condition data 165A-N, 365A-N based, battery states 116A-N, or a combination thereof to be determine whether to instruct the plurality of battery cores 151A-N to operate in the online mode 166 or the standby mode 167 to conserve auxiliary energy.

Several conditions, such as battery states 116A-C and dynamic conditions, can be used by the array controller 170 to determine which battery cores 151A-C to enter the online mode 166 or the standby mode 167. For example, the array controller 170 can look at dynamic conditions to determine whether to switch to the standby mode 167 to bring offline the first set of battery cores 151A-C with a low state of charge 116A. The dynamic conditions can include power flow, needs of dispatch, actual power flow, time-based parameters (e.g., running/operating time), etc. In an example, if there are three power conversion systems 104A-C and the first PCS 104A has a running/operating time of five hours and the other two PCSs 104B-C have a running/operating time of two hours, then the array controller 170 can select the first PCS 104A to enter standby mode 167 because it has been running the longest.

Implementing the schedule 169 based on time-based parameters can be an option that is running in parallel with the monitoring of the environmental condition data 165A-N, 365A-N and the battery states 116A-N (e.g., state of charge 116A). The schedule 169 can be implemented regardless of the state of charge 116A and the environmental condition data 165A-N, 365A-N. A time-based parameter, such as a time condition, results in the array controller 170 instructing a PCS 104 of a battery core 151 to enter the online mode 166 or the standby mode 167. There can be priorities in case of conflicts. For example, environmental condition data 165A-N, 365A-N such as temperature 165A, 365A can have a higher priority than a time-based parameter, such as running/operating time, to require a battery core 151A to stay in standby mode 167 even if the time-based parameter requires switching to the online mode 166.

In some examples, the controllers 170-172 can turn on a heater 156 of the HVAC equipment 168 of the energy storage nodes 105A-N if the battery storage elements 106A-N are too cool. The controllers 170-172 can also turn on the fan 154 and condenser 155 of the HVAC equipment 168 of the energy storage nodes 105A-N if the battery storage elements 106A-N are too hot.

Figure 4:
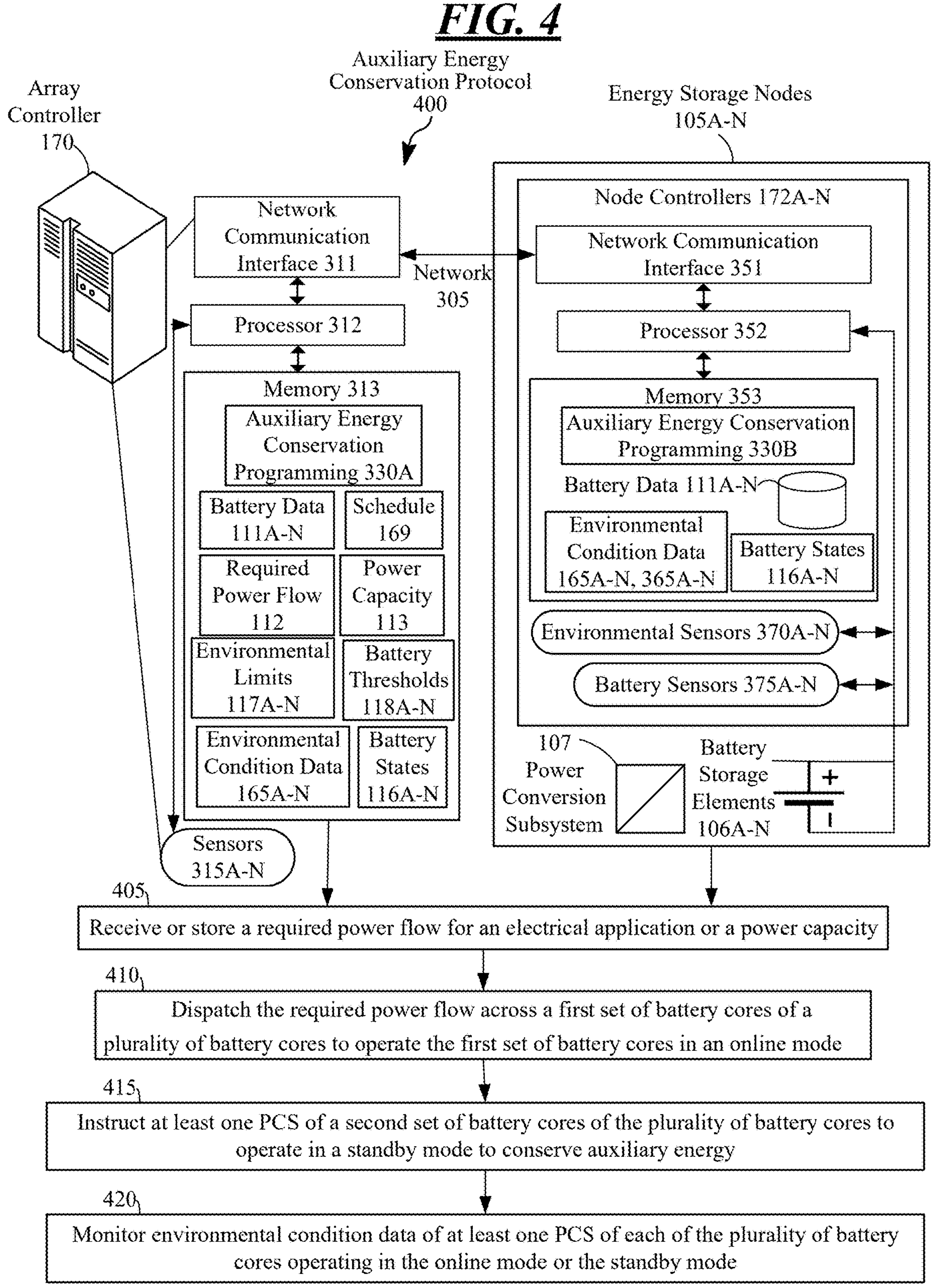
FIG. 4 is an auxiliary energy conservation protocol for the energy storage system that is implemented by the various controllers of the control system and the plurality of energy storage nodes.

FIG. 4 is an auxiliary energy conservation protocol 400 for the energy storage system 101 that is implemented by the various controllers 170-172 of the control system 115 and the plurality of energy storage nodes 105A-N. In the example of FIG. 4, the auxiliary energy conservation protocol 400 is implemented in the auxiliary energy conservation programming 330A of the array controller 170 and the auxiliary energy conservation programming 330B of the node controller 172. Execution of auxiliary energy conservation programming 330A stored in a memory 313 by a processor 312 of the array controller 170 configures the array controller 170 to implement blocks 405, 410, 415, and 420 described below. Execution of auxiliary energy conservation programming 330B stored in a memory 353 by a processor 352 of the node controller 172 can also configure the node controllers 172A-N and core controllers 171A-N to also implement blocks 405, 410, 415, 420 described below. More generally, the execution of the auxiliary energy conservation programming 330A-B by one or more processors 312, 352 can configure one or more controllers 170-172 to implement blocks 405, 410, 415, and 420 below.

Beginning in block 405, the auxiliary energy conservation protocol 400 includes to receive or store a required power flow 112 for an electrical application 103 or a power capacity 113.

Moving now to block 410, the auxiliary energy conservation protocol 400 further includes to dispatch the required power flow 112 across a first set of battery cores 151A-C of a plurality of battery cores 151A-N to operate the first set of battery cores 151A-C in the online mode 166. Each of the battery cores 151A-N include at least one power conversion system (PCS) 104A-N. The at least one PCS 104A-N includes a power conversion unit 152, HVAC equipment 153, and at least one environmental sensor 164A-N to detect environmental condition data 165A-N. Each of the battery cores 151A-N further include at least one energy storage node 105A-N including a battery storage element 106A-N and a node controller 172A-N to receive battery data 111A-N from the battery storage element 106A-N and the environmental condition data 165A-N from the at least one PCS 104A-N.

Proceeding now to block 415, the auxiliary energy conservation protocol 400 further includes to instruct the at least one PCS 104A-N of the second set of battery cores 151D-F to operate in the standby mode 167 to conserve auxiliary energy to cause: disabling of the HVAC equipment 153 of the at least one PCS 104A-N of the second set of battery cores 151D-F; and energizing and connecting an AC bus, a DC bus, or both 125 but not running the power conversion unit 152 of the second set of battery cores 151D-F.

Finishing now, in block 420, the auxiliary energy conservation protocol 400 further includes to monitor the environmental condition data 165A-N of the at least one PCS 104A-N of each of the plurality of battery cores 151A-N operating in the online mode 166 or the standby mode 167.

In FIG. 4, the core controllers 171A-N and node controllers 172A-N can implement a subset or all of the blocks 405, 410, 415, and 420 of the auxiliary energy conservation protocol 400 without the central array controller 170. For example, the auxiliary energy required power flow 112, power capacity 113, etc. can be stored or received by one, a subset, or all of the core controllers 171A-N or node controllers 172A-N of the energy storage nodes 105A-N from the electrical application 103 over the network 305. The auxiliary energy conservation programming 330A may be stored and executed on core controllers 171A-N.

Figure 5:
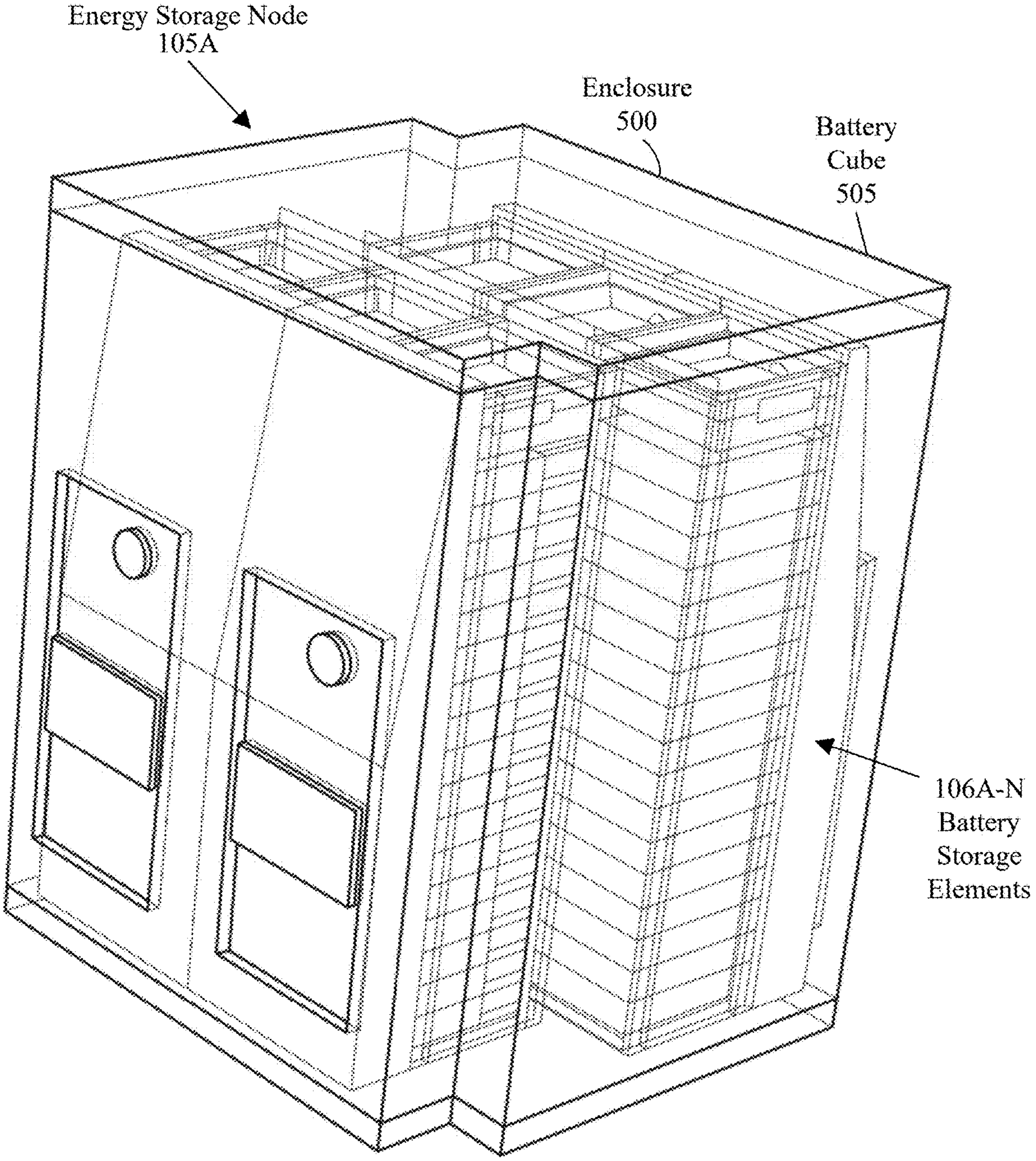
FIG. 5 is a cutaway view of the first energy storage node of the plurality of energy storage nodes and shows details of a plurality of battery storage elements.

FIG. 5 is a cutaway view of the first energy storage node 105A of the plurality of energy storage nodes 105A-N and shows details of a plurality of battery storage elements 106A-N. As shown, the energy storage node 105A includes an enclosure 500, such as a physical housing to store a plurality of battery storage elements 106A-N. The battery storage elements 106A-N can be a collection of one or more batteries, such as a plurality of battery strings or battery banks, which are organized logically, physically, and electrically.

In the example of FIG. 5, the battery storage elements 106A-N can include battery racks (e.g., six are shown) that hold a respective stack of battery modules (e.g., seventeen are shown). The battery modules can include an array of prismatic, pouch, or cylindrical battery cells that are packaged together to increase voltage, amperage, or both. In some examples, battery modules may include an electric vehicle battery pack, e.g., a collection of lithium-ion battery cells that are packaged together.

Each of the energy storage nodes 105A-N can include a collection of one or more enclosures 500A-N like that shown in FIG. 5 that house a plurality of battery storage elements 106A-N packaged together as a battery cube 505 in the example. Of course, the enclosure 500 can be shaped in a variety of other form factors. Each of the battery cubes 505A-N can further include a respective enclosure controller 173A-N that is controlled by a respective node controller 172A-N as part of the control system 115.

Figure 6:
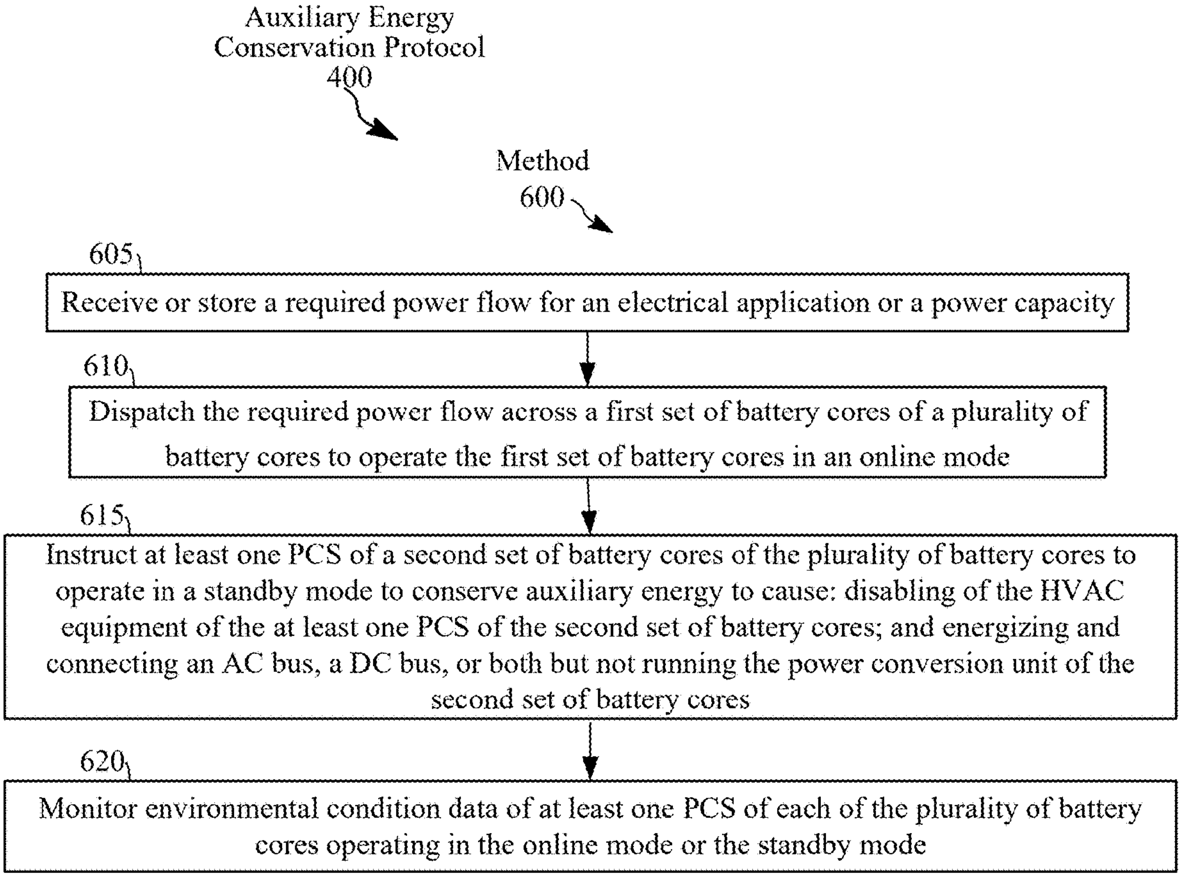
FIG. 6 is a flowchart of a method that can be implemented to conserve auxiliary energy in the energy storage system.

FIG. 6 is a flowchart of a method 600 that can be implemented to conserve auxiliary energy in the energy storage system 100. In the example of FIG. 6, the method 600 implements the auxiliary energy conservation protocol 400 of FIG. 4. Beginning in step 605, the method 600 includes receiving or storing a required power flow 112 for an electrical application 103 or a power capacity 113.

Continuing to step 610, the method 600 further includes dispatching the required power flow 112 across a first set of battery cores 151A-C of a plurality of battery cores 151A-N to operate the first set of battery cores 151A-C in an online mode 166. Each of the battery cores 151A-N include at least one power conversion system (PCS) 104A-N. The at least one PCS 104A-N includes a power conversion unit 152, HVAC equipment 153, and at least one environmental sensor 164A-N to detect environmental condition data 165A-N. Each of the battery cores 151A-N further include at least one energy storage node 105A-N including a battery storage element 106A-N and a node controller 172A-N to receive battery data 111A-N from the battery storage element 106A-N and the environmental condition data 165A-N from the at least one PCS 104A-N.

Proceeding now to step 615, the method 600 further includes instructing the at least one PCS 104D-F of a second set of battery cores 151D-F of the plurality of battery cores 151A-N to operate in a standby mode 167 to conserve auxiliary energy to cause: disabling of the HVAC equipment 153 of the at least one PCS 104D-F of the second set of battery cores 151D-F; and energizing and connecting an AC bus, a DC bus, or both 125 but not running the power conversion unit 152 of the second set of battery cores 151D-F.

Finishing now, in step 620, the method 600 further includes monitoring the environmental condition data 165A-N of the at least one PCS 104A-N of each of the plurality of battery cores 151A-N operating in the online mode 166 or the standby mode 167. In FIG. 6, the core controllers 171A-N, local node controllers 172A-N, and enclosure controllers 173A-N can implement a subset or all of the steps 605, 610, 615, and 620 of the method 600 without the central array controller 170.

In the examples above, the energy system 102, energy application 103, power conversion system 104, energy storage nodes 105A-N, control system 115, array controller 170, core controllers 171A-N, node controllers 172A-N, enclosure controllers 173A-N, etc. each include a network communication interface 161, 311, 351 for wired or wireless communication over one or more networks 305A-N. The networks 305A-N interconnect the links to/from the network communication interfaces 161, 311, 351 of the devices, so as to provide data communications amongst the energy application 103, energy storage nodes 105A-N, control system 115, array controller 170, core controllers 171A-N, node controllers 172A-N, enclosure controllers 173A-N, etc. Networks 305A-N may support data communication by equipment at the premises via wired (e.g., cable or fiber) media or via wireless (e.g., Wi-Fi, Bluetooth™, ZigBee, LiFi, IrDA, etc.) or combinations of wired and wireless technology.

Any of the functionality of the auxiliary energy conservation protocol 400, including auxiliary energy conservation programming 330A-B, described herein for the energy system 102, electrical application 103, power conversion system 104, energy storage nodes 105A-N, control system 115, array controller 170, core controllers 171A-N, node controllers 172A-N, enclosure controllers 173A-N, etc. can be embodied in one more applications or firmware as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language).

In the examples above, the energy system 102, energy application 103, power conversion system 104, energy storage nodes 105A-N, control system 115, array controller 170, core controllers 171A-N, node controllers 172A-N, enclosure controllers 173A-N, etc. can each include a processor. As used herein, a processor 162, 312, 352 is a hardware circuit having elements structured and arranged to perform one or more processing functions, typically various data processing functions. Although discrete logic components could be used, the examples utilize components forming a programmable central processing unit (CPU). A processor 162, 312, 352 for example includes or is part of one or more integrated circuit (IC) chips incorporating the electronic elements to perform the functions of the CPU. The processors 162, 312, 352 for example, may be based on any known or available microprocessor architecture, such as a Reduced Instruction Set Computing (RISC) using an ARM architecture. Of course, other processor circuitry may be used to form the CPU or processor hardware in. The illustrated examples of the processors 162, 312, 352 can include one microprocessor or a multi-processor architecture. A digital signal processor (DSP) or field-programmable gate array (FPGA) could be suitable replacements for the processors 162, 312, 352, but may consume more power with added complexity.

The applicable processor 162, 312, 352 executes programming or instructions to configure the energy system 102, energy application 103, power conversion system 104, energy storage nodes 105A-N, control system 115, array controller 170, core controllers 171A-N, node controllers 172A-N, enclosure controllers 173A-N, etc. to perform various operations. For example, such operations may include various general operations (e.g., a clock function, recording and logging operational status and/or failure information) as well as various system-specific operations (e.g., energy management) functions. Although a processor 162, 312, 352 may be configured by use of hardwired logic, typical processors are general processing circuits configured by execution of programming, e.g., instructions and any associated setting data from the memories 163, 313, 353 shown or from other included storage media and/or received from remote storage media.

In the examples above, the energy system 102, energy application 103, power conversion system 104, energy storage nodes 105A-N, control system 115, array controller 170, core controllers 171A-N, node controllers 172A-N, enclosure controllers 173A-N, etc. each include a memory. The memory 163, 313, 353 may include a flash memory (non-volatile or persistent storage), a read-only memory (ROM), and a random access memory (RAM) (volatile storage). The RAM serves as short term storage for instructions and data being handled by the processors 162, 312, 352 e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

Hence, a machine-readable medium or a computer-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

According to exemplary embodiments of the present disclosure the one or more processors and control circuits can include one or more of any known general purpose processor or integrated circuit such as a central processing unit (CPU), microprocessor, field programmable gate array (FPGA), Application Specific Integrated Circuit (ASIC), Digital Signal Processor (DSP), or other suitable programmable processing or computing device or circuit as desired that is specially programmed to perform operations for achieving the results of the exemplar embodiments described herein. The processor(s) can be configured to include and perform features of the exemplary embodiments of the present disclosure, such as the auxiliary energy conservation protocol 400 and the auxiliary energy conservation programming 330A-B. The features can be performed through program code encoded or recorded on the processor(s), or stored in a non-volatile memory device, such as Read-Only Memory (ROM), erasable programmable read-only memory (EPROM), or other suitable memory device or circuit as desired. Accordingly, such computer programs can represent controllers of the computing device.

In another exemplary embodiment, the program code, such as the auxiliary energy conservation protocol 400 and the auxiliary energy conservation programming 330A-B, can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor(s) for execution as desired, when the non-transitory computer readable medium is placed in communicable contact with the processor(s).

The one or more processors 162, 312, 352 can be included in a computing system that is configured with components such as memory, a hard drive, an input/output (I/O) interface, a communication interface, a display and any other suitable component as desired. The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, or any other suitable network communication interface as desired. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, or any other suitable communication link as desired.

Where the present disclosure is implemented using programming or software, including the auxiliary energy conservation protocol 400 and the auxiliary energy conservation programming 330A-B, the programming or software can be stored in a computer program product or non-transitory computer readable medium and loaded into the computing device using a removable storage drive or communications interface. In an exemplary embodiment, any computing device, such as control system 115 and controllers 170-172, disclosed herein can also include a display interface that outputs display signals to a display unit, e.g., LCD screen, plasma screen, LED screen, DLP screen, CRT screen, or any other suitable graphical interface as desired.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms “comprises,” “comprising,” “includes,” “including,” “has,” “having,” “containing,” “contain”, “contains,” “with,” “formed of,” or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by “a” or “an” does not, without further constraints, preclude the existence of additional identical elements in the process, method, article, or apparatus that comprises the element. Unless otherwise stated, the articles “a” or “an” preceding an element mean one or more of the elements.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount. The terms “approximately” and “substantially” mean that the parameter value or the like varies up to ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

What is claimed is:

1. An energy storage system, comprising:
- a battery array including:
  - a plurality of battery cores including a first set of battery cores and a second set of battery cores, wherein each of the battery cores include:
    - at least one power conversion system (PCS), the at least one PCS including a power conversion unit, heating, venting, and air conditioning (HVAC) equipment, and at least one environmental sensor to detect environmental condition data; and
    - at least one energy storage node including a battery storage element and a node controller to receive battery data from the battery storage element and the environmental condition data from the at least one PCS; and
- an array controller to control the first set of battery cores to operate in an online mode to dispatch a required power flow and a second set of battery cores to operate in a standby mode to conserve auxiliary energy;
- wherein the array controller is configured to:
  - receive or store the required power flow for an electrical application or a power capacity;
  - dispatch the required power flow across the first set of battery cores operating in the online mode;
  - instruct the at least one PCS of the second set of battery cores to operate in the standby mode to cause:
    - disabling of the HVAC equipment of the at least one PCS of the second set of battery cores; and energizing and connecting an AC bus, a DC bus, or both but not running the power conversion unit of the second set of battery cores; and monitor the environmental condition data of the at least one PCS of each of the plurality of battery cores operating in the online mode or the standby mode.

2. The energy storage system of claim 1, wherein the array controller is configured to:

instruct the at least one PCS of the second set of battery cores to operate in the online mode or the standby mode based on the environmental condition data of the first set of battery cores not satisfying an environmental limit; and instruct the at least one PCS of the first set of battery cores to operate in the standby mode in response to the power capacity being satisfied by the second set of battery cores.

3. The energy storage system of claim 2, wherein the environmental condition data includes temperature, humidity, or a combination thereof.

4. The energy storage system of claim 1, wherein the array controller is configured to:

run the power conversion unit of the at least one PCS of the second set of battery cores to enter the online mode in response to a battery state derived from the battery data of the first set of battery cores not satisfying a battery threshold.

5. The energy storage system of claim 4, wherein the battery state includes state of charge, voltage, temperature, or a combination thereof.

6. The energy storage system of claim 5, wherein the battery state includes the state of charge and the battery threshold includes a state of charge limit.

7. The energy storage system of claim 1, wherein the node controller is configured to:

swap the first set of battery cores and the second set of battery cores based on a schedule that includes at least one time-based parameter.

8. A non-transitory computer-readable medium, comprising auxiliary energy conservation programming, wherein execution of the auxiliary energy conservation programming by one or more processors configures one or more controllers to:

receive or store a required power flow for an electrical application or a power capacity;

dispatch the required power flow across a first set of battery cores of a plurality of battery cores to operate the first set of battery cores in an online mode, wherein each of the battery cores include:

at least one power conversion system (PCS), the at least one PCS including a power conversion unit, heating, venting, and air conditioning (HVAC) equipment, and at least one environmental sensor to detect environmental condition data; and at least one energy storage node including a battery storage element and a node controller to receive battery data from the battery storage element and the environmental condition data from the at least one PCS;

instruct the at least one PCS of a second set of battery cores of the plurality of battery cores to operate in a standby mode to conserve auxiliary energy to cause:

disabling of the HVAC equipment of the at least one PCS of the second set of battery cores; and energizing and connecting an AC bus, a DC bus, or both but not running the power conversion unit of the second set of battery cores; and monitor environmental condition data of the at least one PCS of each of the plurality of battery cores operating in the online mode or the standby mode.

9. The non-transitory computer-readable medium of claim 8, wherein execution of the auxiliary energy conservation programming by one or more processors configures one or more controllers to:

instruct the at least one PCS of the second set of battery cores to operate in the online mode or the standby mode based on the environmental condition data of the first set of battery cores not satisfying an environmental limit; and instruct the at least one PCS of the first set of battery cores to operate in the standby mode in response to the power capacity being satisfied by the second set of battery cores.

10. The non-transitory computer-readable medium of claim 9, wherein the environmental condition data includes temperature, humidity, or a combination thereof.

11. The non-transitory computer-readable medium of claim 8, wherein execution of the auxiliary energy conservation programming by one or more processors configures one or more controllers to:

run the power conversion unit of the at least one PCS of the second set of battery cores to enter the online mode in response to a battery state derived from the battery data of the first set of battery cores not satisfying a battery threshold.

12. The non-transitory computer-readable medium of claim 11, wherein the battery state includes state of charge, voltage, temperature, or a combination thereof.

13. The non-transitory computer-readable medium of claim 12, wherein the battery state includes the state of charge and the battery threshold includes a state of charge limit.

14. The non-transitory computer-readable medium of claim 8, wherein execution of the auxiliary energy conservation by one or more processors configures one or more controllers to:

swap the first set of battery cores and the second set of battery cores based on a schedule that includes at least one time-based parameter.

15. A method, comprising:

receiving or storing a required power flow for an electrical application or a power capacity;

dispatching the required power flow across a first set of battery cores of a plurality of battery cores to operate the first set of battery cores in an online mode, wherein each of the battery cores include:

at least one power conversion system (PCS), the at least one PCS including a power conversion unit, heating, venting, and air conditioning (HVAC) equipment, and at least one environmental sensor to detect environmental condition data; and at least one energy storage node including a battery storage element and a node controller to receive battery data from the battery storage element and the environmental condition data from the at least one PCS;

instructing the at least one PCS of a second set of battery cores of the plurality of battery cores to operate in a standby mode to conserve auxiliary energy to cause:

disabling of the HVAC equipment of the at least one PCS of the second set of battery cores; and energizing and connecting an AC bus, a DC bus, or both but not running the power conversion unit of the second set of battery cores; and monitoring environmental condition data of the at least one PCS of each of the plurality of battery cores operating in the online mode or the standby mode.

16. The method of claim 15, further comprising:

instruct the at least one PCS of the second set of battery cores to operate in the online mode or the standby mode based on the environmental condition data of the first set of battery cores not satisfying an environmental limit; and instruct the at least one PCS of the first set of battery cores to operate in the standby mode in response to the power capacity being satisfied by the second set of battery cores.

17. The method of claim 16, wherein the environmental condition data includes temperature, humidity, or a combination thereof.

18. The method of claim 15, further comprising:

running the power conversion unit of the at least one PCS of the second set of battery cores to enter the online mode in response to a battery state derived from the battery data of the first set of battery cores not satisfying a battery threshold.

19. The method of claim 18, wherein the battery state includes state of charge, voltage, temperature, or a combination thereof.

20. The method of claim 19, wherein the battery state includes the state of charge and the battery threshold includes a state of charge limit.

* * * * *